Dec. 21, 1948.     H. W. A. CHALBERG     2,456,916
ELECTRIC BLANKET CONTROL
Filed Jan. 9, 1946
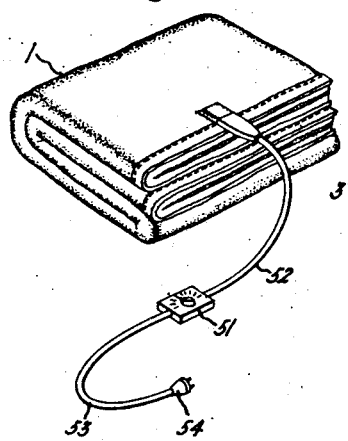
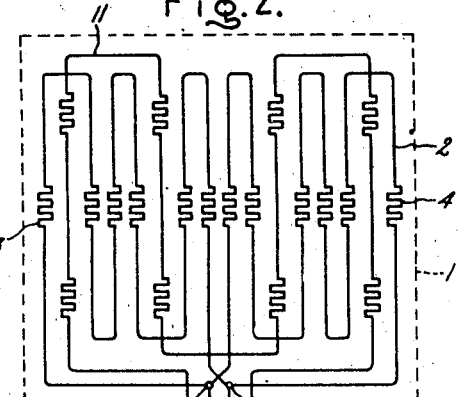
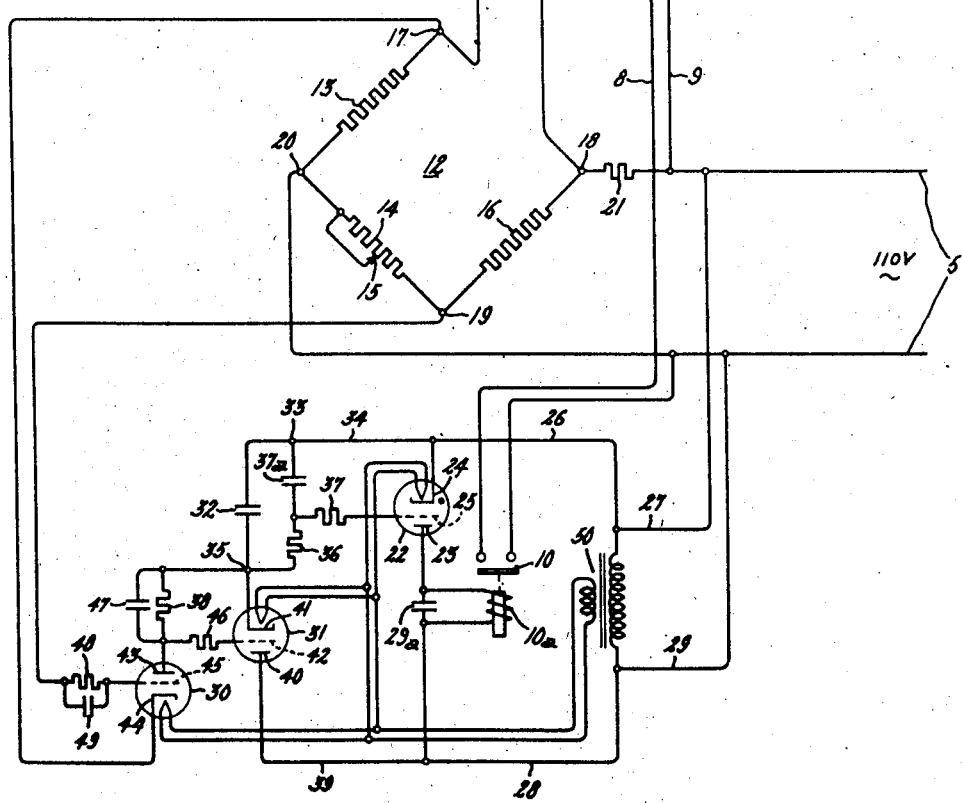
Inventor:
Harry W. A. Chalberg,
by Alfred V. Robert
His Attorney.

Patented Dec. 21, 1948

2,456,916

UNITED STATES PATENT OFFICE 2,456,916

ELECTRIC BLANKET CONTROL

Harry W. A. Chalberg, Berne, N. Y., assignor to General Electric Company, a corporation of New York Application January 9, 1946, Serial No. 639,993

3 Claims. (Cl. 219—46)

This invention relates to electric heaters, more particularly to electrically heated blankets, and it has for its object the provision of a simple, reliable, and inexpensive control system for controlling the blanket heating means.

This invention contemplates the provision of an electrically heated blanket wherein the heating means of the blanket is supplied through electric valve apparatus from an alternating current source, and a more specific object of this invention is the provision in a blanket control system of this character of means for accurately maintaining a preset temperature.

In carrying out this invention in one form thereof, a grid-controlled half-wave rectifier valve is provided to control a suitable control circuit for controlling the blanket heat energy; it is connected to an alternating current source so that half-wave impulses are supplied to the control circuit. The amount of current supplied by the valve to the control circuit is varied by means of a network which controls the grid voltage of the valve. This network comprises a capacitor and two parallel and reversely connected electric valves connected across the alternating current source. Connections are provided from the capacitor to the cathode and grid of the valve which supplies current to the blanket control circuit. One of the reversely connected valves is a grid-controlled valve, and variation of its grid voltage in turn varies the grid voltage of the valve in the control circuit. Means are provided for generating a controlling voltage which is dependent upon the temperature of the blanket. This controlling voltage is applied to the grid of the reversely connected control valve, which then operates to control the valve in the blanket control circuit to cause it to control the blanket heat energy so as to operate the blanket at a selected temperature. The temperature held is selected by adjustable means in the means for generating the controlling voltage.

The controlling voltage preferably will be generated by means of a Wheatstone bridge, which has one resistance leg that responds to the blanket temperature and the resistance of which varies with temperature variations, and another leg having a resistance which is adjustable. The bridge functions to compare the resistances of these two legs and in doing so it generates the controlling voltage for the network which controls the valve in the blanket control circuit. The temperature setting is effected by adjusting the adjustable resistance of the other leg of the bridge.

For a more complete understanding of this invention, reference should be had to the accompanying drawing in which Fig. 1 illustrates an electrically heated blanket embodying this invention; and Fig. 2 is a diagrammatic representation of the blanket together with the control means therefor arranged in accordance with this invention.

Referring to the drawing, this invention has been shown in one form as applied to an electrically heated blanket provided with a flexible blanket body 1 to which is applied heating means 2 consisting of a pair of flexible resistance elements 3 and 4 connected together in parallel and energized from a suitable source of alternating current supply 5, the opposite sides of which are connected to the blanket terminals 6 and 7 by means of conductors 8 and 9. As shown, the terminal 7 is connected directly with the upper supply source conductor 5, whereas the terminal 6 is connected with the lower conductor 5 through a relay 10 which has an operating winding 10a. When this winding is energized the relay is closed to energize the heating means 2, whereas when the winding is deenergized the relay opens to disconnect the heating means. The resistance conductors 3 and 4 are arranged into a number of convolutions covering the respective halves of the blanket, as shown in Fig. 2. It will be understood that the blanket body will be provided with suitable channels (not shown) in which the resistance conductors 3 and 4 are threaded. Preferably, a blanket body such as described and claimed in the United States patent to I. O. Moberg No. 2,203,918, dated June 11, 1940, will be used.

In order to control the energization of the heating means so as to cycle the heating means between energized and deenergized conditions to hold a substantially uniform temperature in the blanket, and also so as to prevent overheating in any part of the blanket, I provide a "feeler" element 11 which preferably is in the form of a filament, which also is threaded through suitable channels (not shown) provided for it in the blanket body 1. This element, as shown, is also formed into a plurality of convolutions so that it is distributed throughout the blanket area.

This feeler element 11 is made of a resistance material which varies widely with temperature changes. I prefer to use a material whose resistance increases rapidly with increases in the temperature. It may be formed of any suitable material of this character, such as nickel, or a suitable alloy of nickel.

Suitable means are provided for controlling the energization of the heating means 2 responsively to changes in the resistance of the feeler circuit 11 as the blanket temperature varies. This means comprises a Wheatstone bridge 12 having four resistance legs. One of these legs has a resistance 13 of fixed value, a second has an adjustable resistance 14, this resistance having an adjustable sliding contact 15, and a third leg has a fixed resistance 16. The fourth leg of this bridge is defined by the feeler resistance 11. As shown, one terminal of the resistance 11 is connected to the terminal 17 of the bridge which terminal joins it to one end of the leg 13. The other terminal of the feeler circuit 11 is connected to the bridge terminal 18 which connects it to the leg 16, and this leg in turn is connected to the leg 14 by a terminal 19, and this leg is connected to the leg 13 by a bridge terminal 20.

The bridge is electrically supplied from the alternating current source 5, the two conductors of which, as shown, are connected to the bridge terminals 18 and 20. A fixed resistance 21 is inserted in the upper conductor of source 5 which functions merely to drop the voltage across the terminals 18 and 20 to a desired value.

The bridge 12 functions to compare the magnitudes of the resistances 11 and 14. The resistance 14 is adjustable to set the blanket temperature. If the blanket temperature is greater than the temperature set on resistance 14, then the voltage across bridge terminals 17 and 19 will be such that the relay 10 will be deenergized, whereas if the blanket temperature is below the desired temperature the resistance in feeler circuit 11 will be lower than formerly and cause the voltage across points 17 and 19 to be such as to effect operation of the relay 10 to close and thereby reenergize the blanket heater. The nature of the voltage, therefore, across the bridge terminals 17 and 19 is an indication of the relationship between the magnitudes of the resistances 11 and 14.

The winding 10a of the relay 10 is controlled directly by means of an electric valve 22 which has an anode-cathode conducting path connected across the supply conductors 5 and in series with the winding 10a. Although the valve 22 may be of any suitable type, it is preferably of the thyratron type having an anode, a cathode, and a control grid and into the envelope of which a small quantity of an inert gas, such as mercury vapor or argon, is introduced. The presence of this gas within the envelope converts the usual pure electronic discharge into an arc stream, so that the valve becomes a grid-controlled arc rectifier. The grid has control only of the starting of the discharge. However, by varying the firing point, i. e., the time in the positive half-cycle of the anode voltage at which the grid voltage attains the critical value necessary to initiate current flow in the anode-cathode circuit, the average value of the current which flows in the output circuit can be varied. If the firing point occurs at or near the beginning of the positive half-cycle of anode voltage, maximum current will flow in the output circuit. If the firing occurs at the 180 degree point, the current flow will be a minimum or zero. For intermediate firing points the output current will have corresponding intermediate values.

As shown, the valve 22 has an anode 23, a cathode 24, and a control grid 25. The cathode is connected to the upper conductor of supply source 5 by conductors 26 and 27, while the anode 23 is connected in series with winding 10a, and with the opposite side of supply source 5 through conductors 28 and 29. A filtering capacitor 29a is connected across the winding 10a.

For the purpose of varying the firing point of the valve 22 in each half-cycle of anode voltage, a network is provided which comprises two electric valves 30 and 31 and a capacitor 32. The upper terminal 33 of this capacitor is connected to the upper conductor of the supply source 5 by conductors 34, and 26, and 27, while the lower terminal 35 is connected through fixed resistor 36 and protective resistor 37 to the grid 25 of valve 22. The resistor 36 is connected in series with capacitor 37a across terminals 33 and 35 of capacitor 32 for the purpose of obtaining a fixed phase shift of the voltage appearing across the capacitor 32. The capacitor terminal 35 is also connected through the fixed resistor 38, the valve 31 and the conductors 39, 28 and 29 with the lower conductor of supply source 5. Thus, the capacitor 32 is connected across the cathode 24 and the grid 25 of valve 22 so that any voltage across the capacitor will be applied across them modified as to phase or magnitude by resistor 36 or capacitor 37a.

Preferably, the valve 31 will be a triode valve, having an anode 40, a cathode 41 and a control grid 42, the cathode being connected to the capacitor terminal 35 and the anode with the lower supply conductor 5, as shown. And preferably, the valve 30 will be similar to the valve 31, having an anode 43, a cathode 44 and a control grid 45. This valve, as shown, has its anode 43 connected through the resistor 38 to capacitor terminal 35 and also through fixed resistor 46 to the grid 42 of valve 31. The resistor 38, as shown, is connected across the grid and cathode of the valve 31 and is included in the anode circuit of valve 30 so that a voltage drop proportional to the anode current of valve 30 is produced across its terminals. A capacitor 47 connected in parallel with resistor 38 is charged by this voltage drop and applies a bias voltage to the grid of valve 31 which renders this increasingly negative as the current transmitted by valve 31 increases.

It will be observed that the valve 30 is connected in parallel with the valve 31, and is reversely connected with respect thereto, i. e., its anode 43 is connected to capacitor terminal 35 while the cathode 41 of valve 31 is connected to this terminal, and its cathode 44 is connected through the bridge 12 with the lower conductor of supply source 5, while the anode 40 of valve 31 is connected to this conductor.

Owing to the reverse connection of the two valves 30 and 31, both halves of the alternating voltage wave of the source 5 are applied to the capacitor 32 and thus the capacitor is alternately charged with voltages of opposite polarity. Thus, during the half-cycle in which the valve 31 conducts, the voltage of the terminal 35 is positive, and during the succeeding half-cycle in which the valve 30 conducts, the capacitor is discharged and recharged to the opposite polarity, so that the terminal 35 has a negative voltage. If valves 30 and 31 conduct equal amounts, the voltage across the capacitor 32 is an alternating voltage having no direct current component. This alternating voltage will lag the anode voltage of valve 22 by approximately 90 degrees if the resistance of capacitor 32 is small compared to the equivalent resistance of the valves 30 and 31. However, if the amounts of current conducted by the two reversely connected control valves are unequal, the alternating voltage across capacitor 32 will have a direct current component, the polarity of which depends upon which of the two oppositely directed currents is the greater and the magnitude depends upon the difference in the amounts of the two currents. Thus, if the valve 31 conducts more current than does the valve 30, the polarity of the net direct current component across capacitor 32 will be such that the terminal 35 is positive with respect to the terminal 33. Conversely, if valve 30 conducts more current than valve 31 conducts, the voltage of terminal 35 is negative with respect to terminal 33. Since the grid 25 of the valve 22 is connected to the terminal 35, the effect of varying the direct current component of the voltage across capacitor 32 is to vary the firing point of the valve 22. Thus, as the direct current component increases in a direction to make terminal 35 less negative, the firing point of valve 22 is advanced and the amount of current supplied by valve 22 to the winding 10a is correspondingly increased. Conversely, as the direct current component is varied in a direction to make terminal 35 more negative, the firing point of valve 22 is retarded and the amount of current supplied to the winding 10a is correspondingly decreased.

The amount of current conducted by the valve 30 is controlled by the difference in potential across the bridge terminals 17 and 19 which voltage, as pointed out previously, depends upon the relative values of the resistances in the feeler circuit 11 and of the resistance 14. As shown, the grid 45 of the valve 30 is connected to the bridge terminal 19 through a resistor 48 and capacitor 49, while the cathode 44 of this valve is connected to the bridge terminal 17. Thus, the bridge 12 in measuring the differences in the magnitudes of the resistances 11 and 14 applies a controlling voltage to the grid-cathode circuit of the valve 30.

The filaments of the tubes 22, 30 and 31 are energized from the alternating current supply source 5 through a suitable transformer 50, the primary of which is connected across the conductors of the source 5 and the secondary of which is connected to the filaments, as shown.

Preferably the relay 10, the bridge 12, and the controlling network described above will all be mounted in a suitable casing 51, the casing being connected with the blanket through a cable 52 which houses the conductors 8 and 9 and the two conductors connecting the feeler 11 with the bridge terminals 17 and 18. And connecting the casing with a suitable source of supply is a twin conductor cord 53 having the usual twin supply plug 54.

In the operation of the electric blanket, it will be understood that when the blanket is connected to the supply source 5 that the blanket body 1 will be relatively cool and, of course, so with the feeler circuit 11. Under these conditions, the voltage between the terminals 17 and 19 will be sufficiently negative to cause valve 30 to conduct less current than valve 31 and thereby make the voltage across capacitor terminals 33 and 35 to become more positive which will advance the firing point of valve 22 thereby causing it to pass more current and thereby energize the relay 10 to close. This, of course, energizes the heating means 2 of the blanket. As the heating means continues to heat, the temperature of the blanket body 1 will increase and so, of course, will that of the feeler resistance 11.

The resistance of the feeler circuit 11, therefore, increases. When the temperature of the blanket attains the temperature set by contact 15 of resistance 14 the voltage between terminals 19 and 17 will increase in a positive sense causing valve 30 to conduct more than valve 31 thereby causing the voltage operating across capacitor terminals 33 and 35 to become more negative and thereby retarding the firing point of valve 22 causing a decrease in current passed through valve 22 and thereby deenergizing relay 10 to permit it to open and shut off the heat to blanket body 1. Following this, the blanket temperature will fall and so will the resistance of the feeler circuit 11 until it reaches the value set by contact 15 on resistor 14 at which point the relay 10 is again energized in the manner described above to reapply heat to the blanket. In this way, the system cycles the heating means "on" and "off" to hold a substantially constant temperature in the blanket body 1.

This temperature may be varied by adjusting the contact 15 to adjust the effective resistance of the resistor 14. When this contact is moved in order to decrease the amount of the resistance connected in the bridge, this will cause the blanket temperature to be controlled at a higher value. This is because the resistance of feeler circuit 11 must attain a higher value than before in order to cause a correct voltage to appear across terminals 17 and 19 to operate the relay 10 to open the heating circuit. Conversely, if the contact 15 is adjusted to increase the effective resistance of resistor 14 then the blanket is held at a lower temperature.

It will be understood that if the blanket be covered or folded accidentally so that a part thereof tends to elevate to a dangerously high temperature the resistance of the feeler circuit as a whole will be increased which will operate in the manner described above to cause the relay 10 to deenergize the heater.

Also it will be understood that if the feeler circuit 11 should be opened, then the relay 10 will be opened because in effect the resistor 11 becomes infinite.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. An electric blanket and the like comprising a blanket body, heating means for said body, means for controlling said heating means including a control circuit therefor controlling said heating means in accordance with the current in said circuit, a source of alternating current voltage, means for supplying half-wave unidirectional current to said control circuit comprising a controlling electric valve provided with an anode, a cathode and a control grid, and having its anode-cathode path included in a circuit with said source and said control circuit, means for supplying to said grid a voltage having a periodically varying component and a direct component comprising a capacitor having connections to said grid and cathode and a pair of reversely connected electric valves connected in circuit with said capacitor across said source, one of said reversely connected valves having an anode, a cathode and a control grid, and means for supplying to the grid and cathode of said reversely connected valve a voltage responsive to the temperature variations of the blanket body so as to supply a voltage to the grid of said controlling electric valve to control the current in said control circuit in order to hold a substantially constant temperature.

2. An electric blanket and the like comprising a blanket body, heating means for said body, means for controlling said heating means including a control circuit therefor controlling said heating means in accordance with the current in said circuit, a source of alternating current voltage, means for supplying half-wave unidirectional current to said control circuit comprising a controlling electric valve provided with a cathode, a control grid, and an anode connected to said control circuit and one side of said source of voltage, and said cathode connected to the other side of said voltage source, and means for supplying to said grid a periodically varying voltage having a direct-current component comprising a capacitor having one terminal connected to said grid and the other terminal to said cathode, and two reversely connected electric valves connected in circuit with said capacitor across said source, one of said reversely connected valves being a triode valve provided with an anode, a cathode and a control grid, a resistance in said blanket having a resistance which varies widely with temperature changes, an external resistance, means interconnecting said resistances for comparing the magnitudes thereof and for generating a controlling voltage which varies in magnitude with the difference in said resistance magnitudes, and means for applying said voltage to said grid and cathode of said triode valve to control the firing of said controlling valve and thereby control the current in said circuit.

3. An electric blanket and the like comprising a blanket body, heating means for said body, means for controlling said heating means including a control circuit therefor controlling said heating means in accordance with the current in said circuit, a source of alternating current voltage, means for supplying half-wave unidirectional current to said control circuit comprising a controlling electric valve provided with an anode, a cathode and a control grid, and having its anode-cathode path included in a circuit with said source and said control circuit, means for supplying to said grid a voltage having a periodically varying component and a direct component comprising a capacitor having connections to said grid and cathode and a pair of reversely connected electric valves connected in circuit with said capacitor across said source, one of said reversely connected valves having an anode, a cathode and a control grid, a Wheatstone bridge having one leg defined by a feeler resistance element which is distributed through said blanket body and whose resistance varies widely with temperature change, and a second resistance exterior of said blanket body, said bridge having a voltage across its two output terminals which voltage is a measure of the difference in the magnitudes of said feeler resistance and said external resistance, and connections between said bridge terminals and the grid and cathode of said reversely connected valve for controlling the firing thereof in accordance with said voltage whereby a voltage is supplied to the grid of said controlling electric valve to control the current in said control circuit in order to hold a substantially constant temperature in said blanket body.

HARRY W. A. CHALBERG.

REFERENCES CITED

The following references are of record in the file of this patent:

UNITED STATES PATENTS

| Number | Name | Date |
|---|---|---|
| 1,979,467 | Hellmuth | Nov. 6, 1934 |
| 2,086,966 | Shrader | July 13, 1937 |
| 2,098,650 | Stein | Nov. 9, 1937 |
| 2,198,462 | Donle et al. | Feb. 6, 1940 |
| 2,203,918 | Moberg | June 11, 1940 |